(12) United States Patent
Sheth et al.

(10) Patent No.: US 8,688,791 B2
(45) Date of Patent: Apr. 1, 2014

(54) METHODS AND SYSTEMS FOR ANALYSIS OF REAL-TIME USER-GENERATED TEXT MESSAGES

(75) Inventors: Amit Sheth, Dayton, OH (US); Karthik Gomadam, San Jose, CA (US); Meenakshi Nagarajan, San Jose, CA (US)

(73) Assignee: Wright State University, Dayton, OH (US)

( * ) Notice: Subject to any disclaimer, the term of this patent is extended or adjusted under 35 U.S.C. 154(b) by 136 days.

(21) Appl. No.: 13/028,397

(22) Filed: Feb. 16, 2011

(65) Prior Publication Data

US 2012/0042022 A1 Feb. 16, 2012

Related U.S. Application Data

(60) Provisional application No. 61/305,337, filed on Feb. 17, 2010.

(51) Int. Cl.
*G06F 15/16* (2006.01)

(52) U.S. Cl.
USPC .......................................................... 709/206

(58) Field of Classification Search
USPC .................................................. 709/206, 224
See application file for complete search history.

(56) References Cited

U.S. PATENT DOCUMENTS

| | | | |
|---|---|---|---|
| 2009/0119281 A1* | 5/2009 | Wang et al. | 707/5 |
| 2009/0177484 A1* | 7/2009 | Davis et al. | 705/1 |
| 2009/0234815 A1* | 9/2009 | Boerries et al. | 707/3 |
| 2009/0249198 A1* | 10/2009 | Davis et al. | 715/261 |
| 2010/0145976 A1* | 6/2010 | Higgins et al. | 707/765 |

OTHER PUBLICATIONS

Amit Sheth, "Semantic Integration of Citizen Sensor Data and Multilevel Sensing: A comprehensive path towards event monitoring and situational awareness," From E-Gov to Connected Governance; the Role of Cloud Computing, Web 2.0 and Web 3.0 Semantic Technologies, Fall Church, VA, Feb. 17, 2009. http://knoesis.org/library/resource.php?id=00702.*

Amit Sheth, "Citizen Sensors to Situational Awareness—an exciting playground for mobile sensors, human computing, services, and semantic analytics", Kno.e.sis Center, Wright State University, Dayton, OH.*

Amit Sheth, "Citizen Sensing, Social Signals, and Enriching Human Experience", IEEE Internet Computing, Jul./Aug. 2009, vol. 13, Issue 4, pp. 80-85; http://knoesis.org/library/resource.php?id=00158.*

Meenakshi Nagarajan, Karthik Gomadam, Amit Sheth, Ajith Ranabahu, Raghava Mutharaju and Ashutosh Jadhav, Spatio-Temporal-Thematic Analysis of Citizen Sensor Data: Challenges and Experiences, Tenth International Conference on Web Information Systems Engineering, Oct. 5-7, 2009, Poland. http://knoesis.org/library/resources.php?id=00559.*

Meena Najarajan, "What Are People Talking About, How People Write, Why People Write", research.*

Ken Fromm, The Real-Time Web: A Primer, Part I and Part II, Aug. 29, 2009 and Sep. 2, 2009, respectively, internet posting.*

(Continued)

*Primary Examiner* — Andrew Chriss
*Assistant Examiner* — Peter Mak
(74) *Attorney, Agent, or Firm* — Dinsmore & Shohl LLP

(57) ABSTRACT

The present invention generally relates to methods and systems for analysis of real-time user-generated text messages. The methods and systems allow analysis to be performed using term associations and geographical and temporal constraints.

19 Claims, 6 Drawing Sheets

(56) References Cited

OTHER PUBLICATIONS

Ashutosh Jadhav, Wenbo Wang, Raghava Mutharaju, Pramod Anantharam, Vinh Nyugen, Amit 7 P. Sheth, Karthik Gomadam, Meenakshi Nagarajan, and Ajith Ranabahu, "Twitris: Socially Influenced Browsing", submitted, Semantic Web Challenge 2009, International Semantic Web Conference 2009, http://wwww.cs.vu.nl/-pmikalswclsubmissions2OO9.html.*

Twitris Internal Page (http://knoesis.wright.edu/internallwiki/index.phplTwitris_Internal_Page), http://wiki.knoesis.org/index.phplTwitris category: microblogging; Jan. 19, 2011.*

Amit Sheth, Christopher Thomas and Pankaj Mehra, "Continuous Semantics to Analyze Real-Time Data", Internet Computing, IEEE, Nov.-Dec. 2010, vol. 14, Issue 6, pp. 84-89.*

Christopher Thomas, Pankaj Mehra, Wenbo Wang, Amit Sheth, Gerhard Weikum and Victor Chan, "Automatic Domain Model Creation Using Pattern-Based Fact Extraction", Kno.e.sis Center Technical Report 2010.*

"tf-idf" from Wikipedia, the free encyclopedia (Redirected from Tfidf); http://en.widipedia.org/wikilTfidf; Feb. 11, 2010.*

Nagarajan et al ("Spatio-Temporal-Thematic Analysis of Citizen Sensor Data: Challenges and Experiences", Web Information Systems Engineering—WISE 2009, Oct. 5-7, 2009, vol. 5802, pp. 539-553).*

Ken Fromm, "The Real-Time Web: A Primer, Part I and Part II", Aug. 29, 2009 and Sep. 2, 2009, respectively, internet posting.

Ashutosh Jadhav, Wenbo Wang, Raghava Mutharaju, Pramod Anantharam, Vinh Nyugen, Amit P. Sheth, Karthik Gomadam, Meenakshi Nagarajan, and Ajith Ranabahu, "Twitris: Socially Influenced Browsing", submitted, Semantic Web Challenge 2009, International Semantic Web Conference 2009, http://www.cs.vu.nl/-pmika/swc/submissions2009.html.

Twitris Internal Page (http://knoesis.wright.edu/internal/wiki/index.php/Twitris_Internal_Page), http://wiki.knoesis.org/index.php/Twitris category: microblogging; Jan. 19, 2011.

"tf-idf" from Wikipedia, the free encyclopedia (Redirected from Tfidf); http://en.widipedia.org/wiki/Tfidf; Feb. 11, 2010.

Amit Sheth, "Citizen Sensors to Situational Awareness—an exciting playground for mobile sensors, human computing, services, and semantic analytics", Kno.e.sis Center, Wright State University, Dayton, Ohio, published as A. Sheth, 'Citzen Sensing, Social Signals, and Enriching Human Experience', IEEE Internet Computing, Jul./Aug. 2009, pp. 80-85.

Meena Najarajan, "What Are People Taling About, How People Write, Why People Write", research, published Apr. 7, 2009, available at: http://knoesis.wright.edu/students/meena/research.php.

\* cited by examiner

METHODS AND SYSTEMS FOR ANALYSIS OF REAL-TIME USER-GENERATED TEXT MESSAGES

CROSS-REFERENCE TO RELATED APPLICATIONS

The present application claims priority to U.S. Provisional Application No. 61/305,337, filed Feb. 17, 2010, which is hereby incorporated by reference.

STATEMENT REGARDING FEDERALLY-SPONSORED RESEARCH OR DEVELOPMENT

This invention was made with government support under Contract No. FA8650-06-D-4406/TO06 awarded by Science Applications International Corporation and Contract No. NSF IIS-0325464 awarded by the National Science Foundation. The Government has certain rights in this invention.

BACKGROUND OF THE INVENTION

As background, many people generate text messages which may express their observation, experience, or opinion of a particular event. Some of these text messages may be generated in real time, i.e., while the people are actually observing or experiencing the event. Other people may generate a message in order to simply comment on the event after having heard or read about it. The authors of these messages may post them to a website or send them to other people using a networking framework.

SUMMARY OF THE INVENTION

It is against the above background, that because these text messages may contain the thoughts and opinions of many people, the inventors of the present application have recognized that such thoughts and opinions may collectively reflect the general view point or opinion of the event. When analyzed over a time period, these messages may further reflect changes in viewpoint which may have taken place over the time period. When analyzed for a particular geographic region, these messages may also reflect the opinions and viewpoints that are specific to that region. Such analysis based on temporal and/or geographic considerations may reflect additional information about the event and can be provided to individuals, companies, and other computer systems for further evaluation or action.

In one embodiment, a system for analyzing electronic messages is disclosed. The system includes a processing circuit configured to store one or more electronic messages related to an event in a memory. The one or more electronic messages have temporal information, geographical information, and event descriptor terms. The processing circuit is also configured to determine a set of electronic messages using the temporal and geographical information. The processing circuit is further configured to parse the set of electronic messages to determine event descriptor terms. The processing circuit is yet further configured to generate term frequency values and association strength values for the event descriptor terms. The processing circuit is also configured to use the term frequency values and the association strength values to generate term weight values for the event descriptor terms that are indicative of the thematic importance of the event descriptor terms. The processing circuit is additionally configured to use the term weight values to select one or more event descriptor terms. The processing circuit is also configured to provide the selected event descriptor terms to an electronic display.

In another embodiment, a method for analyzing electronic messages is disclosed. The method includes storing one or more electronic messages related to an event in a memory. The one or more electronic messages have temporal information, geographical information, and event descriptor terms. The method also includes determining a set of electronic messages using the temporal and geographical information. The method further includes parsing the set of electronic messages to determine event descriptor terms. The method yet further includes generating term frequency values and association strength values for the event descriptor terms. The method also includes using the term frequency values and the association strength values to generate term weight values for the event descriptor terms that are indicative of the thematic importance of the event descriptor terms. The method further includes using the term weight values to select one or more event descriptor terms. The method additionally includes providing the selected event descriptor terms to an electronic display.

In another embodiment, a computer readable medium storing non-transitory machine instructions is disclosed. The instructions, when executed by a machine, cause the machine to store or more electronic messages related to an event in a memory. The messages include temporal information, geographical information, and event descriptor terms. The instructions also cause the machine to determine a set of electronic messages using the temporal and geographical information. The instructions further cause the machine to parse the set of electronic messages to determine event descriptor terms. The instructions additionally cause the machine to generate term frequency values for the event descriptor terms. The instructions also cause the machine to generate association strength values for the event descriptor terms. The instructions further cause the machine to use the term frequency values and the association strength values to generate term weight values for the event descriptor terms that are indicative of the thematic importance of the event descriptor terms. The instructions yet further cause the machine to use the term weight values to select one or more event descriptor terms. The instructions additionally cause the machine to provide the selected event descriptor terms to an electronic display.

BRIEF DESCRIPTION OF THE DRAWINGS

The following detailed description of specific embodiments can be best understood when read in conjunction with the following drawings, where like structure is indicated with like reference numerals and in which.

Figure 1:
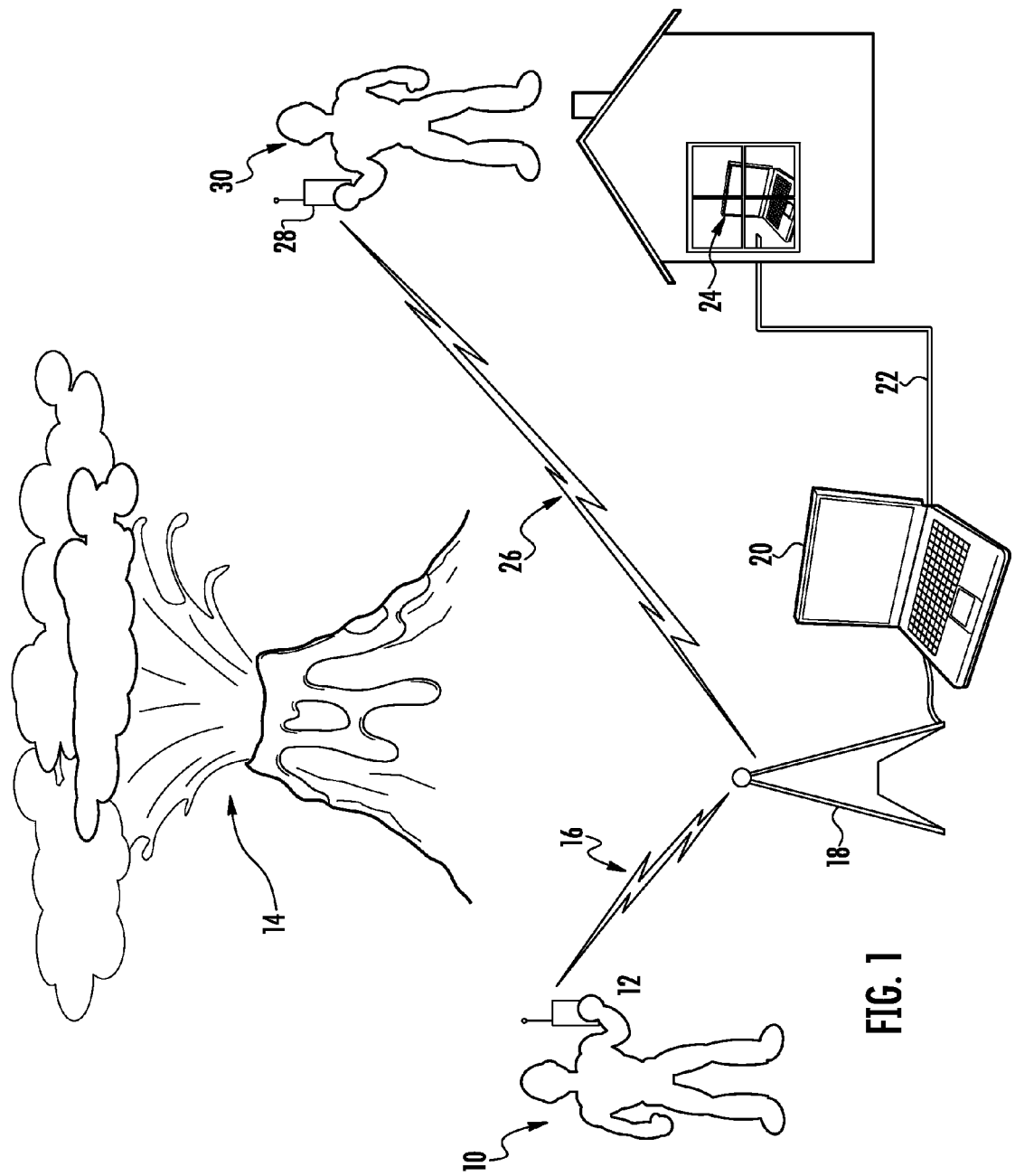
FIG. 1 is an illustration of a network infrastructure.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION

The embodiments described herein generally related to methods and systems for analyzing real-time user-generated text messages. The emergence of microblogging platforms such as Twitter™, for example, has revolutionized how real-time user-generated information is disseminated and consumed. These platforms may allow people to create text messages and transmit them to a large number of readers in a very short period of time. Much of the information contained in the text messages may be experiential in nature and may include first-hand observations, experiences, and opinions related to a real-world event. Such experiential attributes of an event may be valuable to governments, companies, or organizations which are concerned about the event, including people's perception of the event. For example, a bill introduced in Congress (i.e., the "event") may spawn numerous text messages commenting on the bill. Members of Congress may be interested in quickly determining what people are saying about the bill, either good or bad. As another example, a natural disaster (i.e., the "event") may also cause people to generate text messages regarding their experiences of or comments on the disaster. In general, the occurrence of any noteworthy event may cause a plethora of text messages to be generated and disseminated with virtually no time lag. Such user-generated data may act as a lens into the social perception of the event.

In addition to using text messages to determine what people are saying about an event, it may be possible to use the text messages to determine where (spatial) and when (temporal) they are saying it. People's opinion about an event may be different from country to country or even from state to state. Thus, it may be useful to narrow the analysis of the text messages to a specific continent, country, state, or city. Likewise, the opinion about an event may change over time such as, for example, if new information about the event becomes available. These changes may take place over hours, days, or even weeks. Therefore, it may be useful to focus the analysis of the text messages to a specific time period. For example, if a recall is issued for a consumer product, it may be helpful to determine how public opinion changes in the days following the announcement of the recall. In summary, text messages about an event may be analyzed for thematic (e.g., public opinion), spatial (e.g., geographic), and temporal attributes.

Referring now to FIG. 1, a network infrastructure is shown, according to an exemplary embodiment. Person 10 may observe event 14 in real time and may have access to a message portal 12 on which a text message related to the event may be written. The text message may be of any electronic message format including, but not limited to, a cellular text message (e.g., SMS, MMS, etc.), a post to a social media service (e.g., a Twitter™ "tweet," a post to Facebook™, etc.), an email, or any other form of electronic message. Message portal 12 may be a smart phone, a personal digital assistant, laptop computer, desktop computer, or any other device which permits person 10 to author and transmit a text message to another electronic device or to other people. Event 14 may be any type of happening or incident including, but not limited to, sporting events, political events, natural phenomena, and so forth. Event 14 may occur relatively quickly, such as an earthquake, or it may occur over a longer period of time, such as the passage of a bill through Congress. Event 14 may also include the failure to do something (i.e., a non-action) such as the failure of a government to respond quickly to a disaster. In short, event 14 may be any type of happening which may cause people to generate text messages which offer observations, experiences, or opinions about event 14.

Message portal 12 may provide the text messages to one or more other computer systems and electronic devices. As shown in FIG. 1, message portal 12 may communicate with server 20 via connection 16. Server 20 receives the incoming text messages via infrastructure 18, which may include any number of hardwired or wireless connections. For example, if message portal 12 is a cellular phone, connection 16 may be wireless and infrastructure 18 may include one or more cellular receivers that receive the text messages and relay them to server 20 over hardwired land lines. Any number of combinations of wireless and hardwired communications mediums is envisioned for connection 16 and infrastructure 18. For example, connection 16 and infrastructure 18 may include, but are not limited to, communications mediums based on CDMA, GSM, Bluetooth, WiFi, fiber optic, satellite, radio, wideband, and any other wireless or hardwired communications format.

Similarly, server 20 may provide the text messages to other electronic devices, such as cellular phones, pagers, portable computers, PDAs, desktop computers, computer servers, on board vehicle computer systems, or any other electronic device configured to receive text messages. For example, server 20 may provide the text messages about event 14 to cellular phone 28 via wireless connection 26. Cellular phone 28 may include one or more electronic displays configured to display the text messages about event 14 to person 30. Server 20 may also provide the text messages to home computer 24 via wired connection 22 for display on a monitor. Connections 22 and 26 may also include any number of other electronic devices between server 20, home computer 24, and cellular phone 28. For example, connection 22 may include any number of routers, servers, etc., that receive and relay the text messages about event 14. In this way, person 10 may use message portal 12 to communicate text messages about event 14 throughout the world.

The text messages related to event 14 may be written in the any language and may contain, inter alia, descriptions, comments, or opinions about event 14. As such, the text messages may contain words or phrases called "event descriptors" which may describe or otherwise relate to event 14. The event descriptors may be a kind of shorthand which may be adopted by the many people authoring the text messages. For example, "Big 3" may be an event descriptor for text messages related to Ford, General Motor, and Chrysler. Event descriptors may contain "n" number of consecutive words in the text message and may be referred to as an "n-gram." Typically, event descriptors contain one word (a unigram), two words (a bigram), or three words (a trigram), although event descriptors having other word lengths is contemplated as well. The length of the event descriptors may be adjusted by person 10, and event descriptors may be used which have different word lengths. For example, event descriptors for event 14 may include unigrams and trigrams.

Because person 10 may be constrained to a word limit by an application or may be in a hurry, the actual content of a text message may not follow proper grammar or spelling rules. For example, a text message may have a combination of complete sentences, incomplete sentences, and phrases, for example. Furthermore, words and phrases in the text message may be abbreviated or replaced by a shorthand equivalent, such as "u" for the word "you" or "gr8" for the word "great." Also new words or phrases may be created which specifically relate to event 14 (e.g., "9/11"). Thus, it may be difficult to analyze the content of a real-time user-generated text message in order to determine what person 10 is actually trying to communicate.

Server 20 may be configured to provide analysis of the text messages about event 14, to allow other users, such as person 30, to better understand event 14. As additional text messages are sent about event 14, the language, tone, and ideas present in the messages may vary with time or location. In general, social perceptions and experiences reported by people in a text message may not be the same across spatial or temporal boundaries. For example, person 10 may be located in Hawaii and witness event 14 as it happens. Person 30, however, may be located in France and use cellular phone 28 to communicate additional text messages about event 14 to server 20. Because person 10 and person 30 are located in different geographical areas, and may be commenting about event 14 at different times, their respective text messages may also differ. For example, the initial text messages from Hawaii about event 14 may focus on the destruction of homes and evacuation efforts. Over time, however, the focus of the text messages about event 14 may shift to how air travel has been disrupted by the volcano's ash. Server 20 may therefore analyze the text messages and provide the analysis to a third user utilizing home computer 24 to convey what, where, and when people are saying or thinking about event 14.

The text messages about event 14 may also include images, audio, URL links, or other non-language content, which may contribute nothing to the analysis of the text messages. In some embodiments, this type of content may either be removed before the analysis by server 20 or ignored entirely. Text messages may also contain metadata, which may be extra information attached to the text message (or to the file containing the text message) which may not appear in the body of the message. Metadata may include the date and time the text message was composed or sent, information about the author, or information about the geographic location from where the text message was sent. For example, the metadata may include information indicating that person 10 is located in Hawaii and that the message was sent at a specific time. Other types of metadata may be included as well. This metadata may be helpful in analyzing the text message, since it may provide spatial and temporal information about the message.

Server 20 may also aggregate (e.g., collect) a plurality of text messages related to event 14 in order to analyze them. Because of the huge volume of text messages which are sent every day, it may be necessary to create a search protocol in order to filter out unwanted text messages (e.g., not related to event 14) and only keep those of interest (e.g., those related to event 14). One way to collect text messages related to event 14 is to filter all the text messages using a set of seed keywords. The seed keywords may be obtained, for example, by using Google Insight for Search, which may provide top-searched and trending keywords across specific regions, categories, time periods, and properties. Other ways to obtain the seed keywords may be used as well. The seed keywords may include hashtags, which may be symbols added in front of a word in the body of the text message which indicates the subject matter of the text message. In Twitter™, person 10 or person 30 may add "#" before a word to denote it as a hashtag. For example, the word "#economy" in a tweet may indicate that this text message is related to the economy.

Upon obtaining the seed keywords, server 20 may perform a search on all text messages using the seed keywords in order to create a subset of text messages related to a particular event (e.g., event 14). The text messages resulting from the initial search may introduce new keywords, either determined by server 20, or determined by the content of the text messages, which may be used to re-perform the search (using the new keywords). Thus, aggregating a plurality of text messages related to event 14 may be an iterative process.

Figure 2:
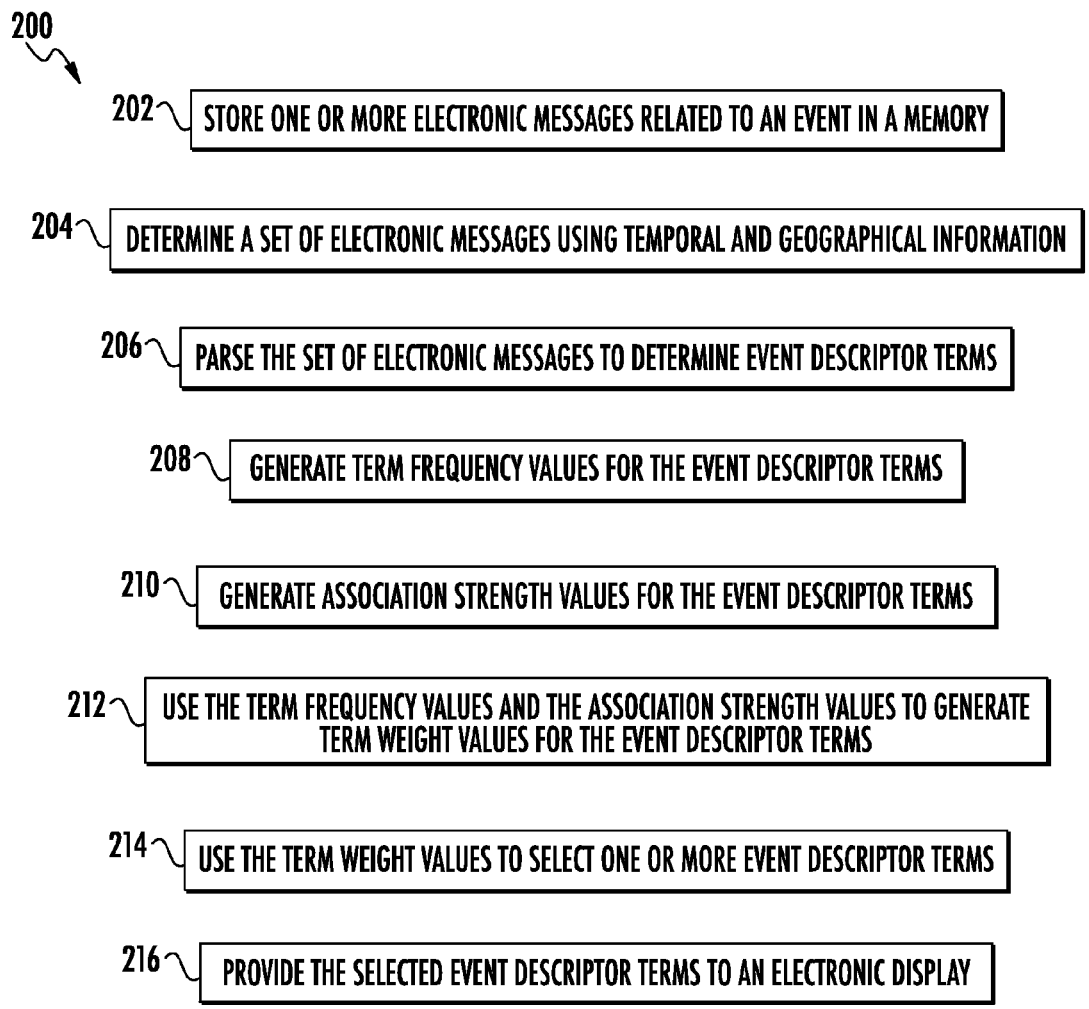
FIG. 2 shows a method for analyzing electronic messages.

Referring now to FIG. 2, method 200 for analyzing text messages is shown, according to an exemplary embodiment. Method 200 includes storing one or more electronic messages related to an event in a memory (202). For example, server 20 shown in FIG. 1 may store text messages relating to event 14 in a local memory. In other embodiments, the text messages are stored on a remote computer system and accessed by server 20 over a network.

Method 200 also includes determining a set of electronic messages using temporal and geographic information (204). For example, after aggregating a plurality of text messages related to event 14, server 20 may perform an analysis on the text messages in order to determine a thematic, spatial, or temporal attribute of the collective text messages. The thematic attribute may concern the general perception of event 14 by the authors of the text messages (e.g., person 10, person 30, etc.). The spatial attribute may indicate the geographic origin of the text message (e.g., the locations of persons 10, 20, etc.). Additionally, the temporal attribute may indicate the time (and date) the text message was composed or sent.

In order to analyze the text messages related to event 14 in the context of a particular place and time, server 20 may create a subset of the text messages related event 14 which may be called a spatio-temporal set. The spatio-temporal set group may comprise text messages sent from a particular geographic region and sent within a certain time period. The spatio-temporal set may be created in response to input from a user who may specify the geographic region and the time period in which he or she is interested. For example, for text messages related to a natural disaster, the user may select a particular country (e.g., France) and may select a certain time period (e.g., the two days immediately following the natural disaster of event 14). A spatio-temporal set may be created from these spatial and temporal constraints such that the spatio-temporal set includes text messages related to the natural disaster sent from France during the two days immediately following the natural disaster. Other users may be interested in analyzing the text messages sent from a different geographic location or a different time period. Thus, for the same set of text messages related to a particular event, any number of spatio-temporal sets may be created from these text messages, based on the user's preference.

In order to create a spatio-temporal set, server 20 may search each text message related to the event and determine from where the text message was sent and when the text message was sent. Text messages may include a geographic origin tag and a time origin tag. The geographic origin tag may indicate the geographic location from where the text message was sent. The geographic origin tag may be embedded in the text message itself or, more likely, may be part of the metadata associated with the text message. The geographic origin tag may indicate the continent, country, state, city, etc. from where the text message originated. As an example, the geographic origin tag (e.g., metadata) of a text message may indicate that it originated from Dayton, Ohio, USA. Alternatively, the geographic origin tag may indicate a particular building, stadium, park, etc., which may allow one to subsequently determine the corresponding country, state, or city. As another example, the geographic origin tag may indicate that the text message originated from the Taj Mahal, which may allow one to determine that it originated from Agra, India. Thus, it is contemplated that the geographic origin tag may include any type of information which may be used to determine the geographic location from where the text message was sent. Some geographic origin tags may indicate more precisely than others the geographic location. For example, a geographic origin tag from one text message may indicate a specific city, while one from another text message may only indicate the country. This may be due to, for example, variations in the quality of the text messages, the internet connection, and application program used to send the text message.

Similarly, the time origin tag may indicate the time and date when the text message was sent. The time origin tag may be embedded in the text message itself or, more likely, may be part of the metadata associated with the text message. The time origin tag may indicate the day, month, year, and time of day the text message was sent. As an example, the time origin tag (e.g., metadata) of a text message may indicate that it was sent on Jan. 1, 2010 at 1:00 pm from the Eastern Time Zone of the United States. The time origin tag may be based on when the text message is posted to the application program used to send the text message. Other ways of establishing the time origin tag may be used as well.

Any form of metadata associated with a text message may be used to determine the geographic and temporal origins of the message. Such metadata may be created automatically as part of the messaging process. For example, header information may be automatically generated when an email is sent and may include geographic or temporal information about the message. The metadata may also include a link or other information that may indicate where the geographic or temporal information may be located. For example, a message through a social networking website may include a username as part of the metadata associated with the message. The profile associated with that username may include the geographic location of the user. In another example, the metadata may include a source IP address which may be used to approximate the geographic origin of the message.

Method 200 is also shown to include parsing the set of electronic messages to determine event descriptor terms (206). For example, after creating the spatio-temporal set, the text messages contained therein may be analyzed by server 20 in order to find out what people are saying about event 14. As part of this analysis, each text message may be deconstructed so that it is represented as one or more vectors of n-grams, denoted by "ngram$_i$," where "i" is the i$^{th}$ n-gram for that text message. Consider an example where the text message reads, "The game was played well." When the length of the n-gram is set to one (e.g., a unigram), each word in the text message is a unigram. Continuing with this example, when the length of the n-gram is set to two (e.g., a bigram), each two consecutive words is a bigram (e.g., "The game," "game was," etc.) Similarly, when the length of the n-gram is set to three (e.g., a trigram), each three consecutive words is a trigram (e.g., "The game was," "game was played," etc.) N-grams of other lengths may be used as well. Note that the vector representation of each text message may be constructed after removing "stop word" unigrams, all URL segments, hyperlinks, and domain-specific stop words like retweet, rt@ etc. "Stop words" may be common words that are likely not relevant to the search such as, for example, words like "a," "the," and "is." In order to deconstruct each message into its vector representation, an engine, such as Lucene, may be used as the indexing mechanism.

Method 200 is further shown to include generating term frequency values for the event descriptor terms (208). Having deconstructed the text messages into a series of n-grams, a weight may be assigned to each n-gram based on how frequently the n-gram appears in the text messages. Such a weight may indicate its relative thematic importance as compared to other n-grams. The weight may be determined by the TFIDF (Term frequency—inverse document frequency) score, which may be calculated as follows:

$$ngram_i(tfidf) = \log\frac{M}{m},$$

where ngram$_i$(tfidf) is the weight of n-gram "i," M is the total number of text messages in the spatio-temporal set, and m is the number of text messages (in the spatio-temporal set) in which the n-gram appears. Other ways to determine the weight may be used as well. The weight may be calculated from the Lucene index and may be modified by the following heurstics.

In some embodiments, the weight of the n-grams, denoted by "ngram$_i$(tfidf)," may be modified based on the number nouns that appear in the n-gram since n-grams with more nouns may indicate a stronger thematic importance. For example, the Stanford natural language parser may be used to parse an n-gram (or the text message) and ascertain which words are considered nouns. As such, each n-gram weight may be multiplied by the proportion of nouns to total words for each n-gram. Similarly, the weight of the n-grams may be modified base on the number of "stop words" which appear in the n-gram, since the thematic importance may be reduced as more stop words are used. Accordingly, each n-gram weight may be multiplied by the proportion of non-stop-words to total words for each n-gram. As discussed above, "stop words" may be common words that are likely not relevant to the thematic importance of the n-gram such as, for example, words like "a," "the," and "is."

In one embodiment, after determining the weight assigned to each n-gram, lower and higher-order n-grams that have overlapping segments (e.g., "general" and "general motors") and the same TFIDF scores are filtered by picking the higher-order n-gram. The n-grams may then be sorted by their TFIDF score, and the event descriptors may be defined as a number of the n-grams having the highest TFIDF score. For example, the top 5 n-grams (e.g., having the highest TFIDF scores) may be defined as the event descriptors. Five may be a suitable number of n-grams, for example, for Twitter™ which has a limit of 140 characters per text message (e.g., "tweet"). The number of the top n-grams defined as event descriptors may be more or less than five.

Method 200 is further shown to include generating association strength values for the event descriptor terms (210). Owing to the varied vocabulary used by posters to refer to the same descriptor, region specific dictions, and evolving popularity of words, it is possible that the above thematic score was not representative of an event descriptor's importance. Consider a scenario where the phrase "Big 3" was used to refer to the three car giants "GM," "Ford," and "Chrysler" but was not used as frequently as the three words together or vice versa. The presence of contextually relevant words should ideally strengthen the score of the event descriptor. However, one may need to pay attention to changing viewpoints in citizen observations that may result in event descriptors occurring in completely different contexts. If the usage of "Ford" is not in the context of the "Big Three" (e.g. discussions around Ford surround its new "Ford Focus" model), its presence should not affect "Big Three's" importance.

The Contextually Enhanced Thematic Score describes how the thematic score of an extracted event descriptor, "Big 3" in the above example, is amplified as a function of the importance of its strong associations—"General Motors," "Ford," and "Chrysler" and the association strengths between the descriptor and the associations. For sake of brevity, one may call the ngram, event descriptor whose thematic score we are interested in affecting as the "focus word" (or "fw") and its strong associations as $C_{fw}=\{aw_1, aw_2, \ldots\}$ ("associated word" or "aw"). The thematic score of the focus word is then enhanced as: $fw(th)=fw(tfidf)+\Sigma\ assoc_{str}(fw, aw_i) \times aw_i(tfidf)$ (Eq. 1), where fw(tfidf) and $aw_i(tfidf)$ are the TFIDF scores of the focus word and associated word, respectively, as described in the previous section; $assoc_{str}(fw, aw_i)$ is the association strength between the focus word and the associated word. Described below is a way to find strong associations for a focus word and compute $assoc_{str}$ scores. The algorithm may begin by first gathering all possible associations for fw and placing them in $C_{fw}$. This disclosure may define associations or the context of a word as thematically strong event descriptors (in the top 5 n-grams of an observation) that co-occur with the focus word in the given spatio-temporal set. The goal may be to amplify the score of the focus word only with the strongly associated words in $C_{fw}$. One way to measure strength of associations is to use word co-occurrence frequencies in language. One may measure the association strength between the focus word and the associated words $assoc_{str}(fw, aw_i)$ using the notion of point-wise mutual information in terms of co-occurrence statistics. One may measure $assoc_{str}$ scores as a function of the point-wise mutual information between the focus word and the context of $aw_i$. This may be done to ensure that the association strengths are determined in the contexts in which the descriptors occur. One may call the contexts for $aw_i$ as $Caw_i=\{caw_1, caw_2, \ldots\}$, where $caw_k$'s are thematically strong descriptors that co-locate with $aw_i$. The term $assoc_{str}(fw, aw_i)$ is computed as:

$$assoc_{str}(fw, aw_i) = \frac{\sum_k (pmi(fw, caw_k))}{|Caw_i|}, \quad \forall\ caw_k \in Caw_i,$$

where the point-wise mutual information between fw and $caw_k$ (the context of $aw_i$), is calculated as:

$$pmi(fw, caw_k) = \log\frac{p(fw, caw_i)}{p(fw)p(caw_k)} = \log\frac{p(caw_k | fw)}{p(caw_k)},$$

where $$p(fw) = \frac{n(fw)}{N},$$

$$p(caw_k | fw) = \frac{n(caw_k, fw)}{n(fw)}, \text{ and}$$

n(fw) is the frequency of the focus word; $n(caw_k, fw)$ is the co-occurrence count of words $caw_k$ and fw; and N is the number of tokens. All statistics may be computed with respect to the corpus defined by the spatio-temporal setting. As one can see, this score may not be symmetric and, if the context of $aw_i$ is poorly associated with fw, $assoc_{str}(fw, aw_i)$ may have a low score.

Method 200 is also shown to include using the term frequency values and the association strength values to generate term weight values for the event descriptor terms (212). At the end of evaluating all associations in Cfw, one may pick those event descriptors whose association scores are greater than the average association scores of the focus word and all associations in Cfw. The thematic weights of these associations along with their strengths may be plugged into the following equation in order to compute the enhanced thematic score $ngram_i(th)$, of the n-gram event descriptor:

$$fw(th)=fw(tfidf)+\Sigma assoc_{str}(fw, aw_i) * aw_i(tfidf)$$

where fw(th) is the enhanced thematic score for the focus word, fw(tfidf) is the TFIDF score for the focus word, $aw_i$ is the ith associated word, $assoc_{str}(fw, aw_i)$ is the strength of association between the focus word and $aw_i$, and $aw_i(tfidf)$ is the TFIDF score of the ith associated word.

In some embodiments, the term weight values may also include adjustments for temporal or spatial considerations. For example, while the thematic scores are good indicators of what is important in a spatio-temporal setting and may be used as the term weight values alone, certain event descriptors tend to dominate discussions. In order to allow for less popular, possibly interesting event descriptors to surface, one may discount the thematic score of a descriptor depending on how popular it has been in the recent past. The temporal discount score for a n-gram, an user adjustable factor depending on the nature of the event, may be calculated over a period of time as:

$$ngram_i(te) = temporal_{bias} \times \sum_{d=1}^{D} \frac{ngram_i(th)^d}{d},$$

where $ngram_i(th)$ is the enhanced thematic score of the descriptor on day d, D is the duration for which the dampening factor is applied (e.g., the recent week). However, this temporal discount might not be relevant for all applications. For this reason, one may also apply a $temporal_{bias}$ weight ranging from 0 to 1—a weight closer to 1 gives more importance, while a weight closer to 0 gives lesser importance to past activity.

In further embodiments, the importance of a descriptor may also be discounted based on its occurrence in other spatio-temporal sets. Event descriptors that occur all over the world on a given day may not be as interesting compared to those that occur only in the spatio-temporal set of interest. The spatial discount score for an n-gram may be defined as a fraction of spatial sets or partitions (e.g. countries) that had activity surrounding this descriptor as:

$$ngram_i(sp) = \frac{k}{|spatialtemporalsets|} \times (1 - spatial_{bias}),$$

where k=number of spatio-temporal sets in which the n-gram occurred. Similar to the temporal bias, one may also introduce a $spatial_{bias}$ that gives importance to local vs. global activity for the descriptor on a scale of 0 to 1. A weight closer to 1 does not give importance to the global spatial discount while a weight closer to 0 gives a lot of importance to the global presence of the descriptor.

Depending on the event of interest, both these discounting factors can also vary for different spatio-temporal sets. For example, when processing tweets from India for the Mumbai attack, setting the $spatial_{bias}$ to 1 eliminates the influence of global social signals. While processing tweets from the U.S., one might want a stronger global bias given that the event did not originate there. Both these parameters may be set before one begins the analyzing of the observations.

Finally, the spatial and temporal effects may be discounted from the final score making the final spatio-temporal-thematic (STT) weight of the n-gram as:

$$w_i=ngram_i(th)-ngram_i(te)-ngram_i(sp)$$

Method 200 also includes using the term weight values to select one or more event descriptor terms (214). For example, server 20 shown in FIG. 1 may utilize the term weight values to determine a set of event descriptors for event 14 (e.g., "Mauna Loa," "volcano," "lava," etc.). By way of further example, if STT weights are used to constrain the term weights to a week after event 14 and originating from Florida, the set of event descriptors may change (e.g., "airplanes grounded," "ash," and "boat travel").

Method 200 additionally includes providing the selected event descriptor terms to an electronic display (216). For example, server 20 may provide the selected event descriptor terms to a monitor connected to server 20 or to the display of another electronic device (e.g., the display of home computer 24, a display of cellular phone 28, etc.). In some embodiments, the selected descriptor terms provided to the display also have associated visual indicia characteristics that are based on the term weight values. For example, the term weight values may be used to determine the size, shape, shading, or position of the selected event descriptor terms on the display.

Figure 3:
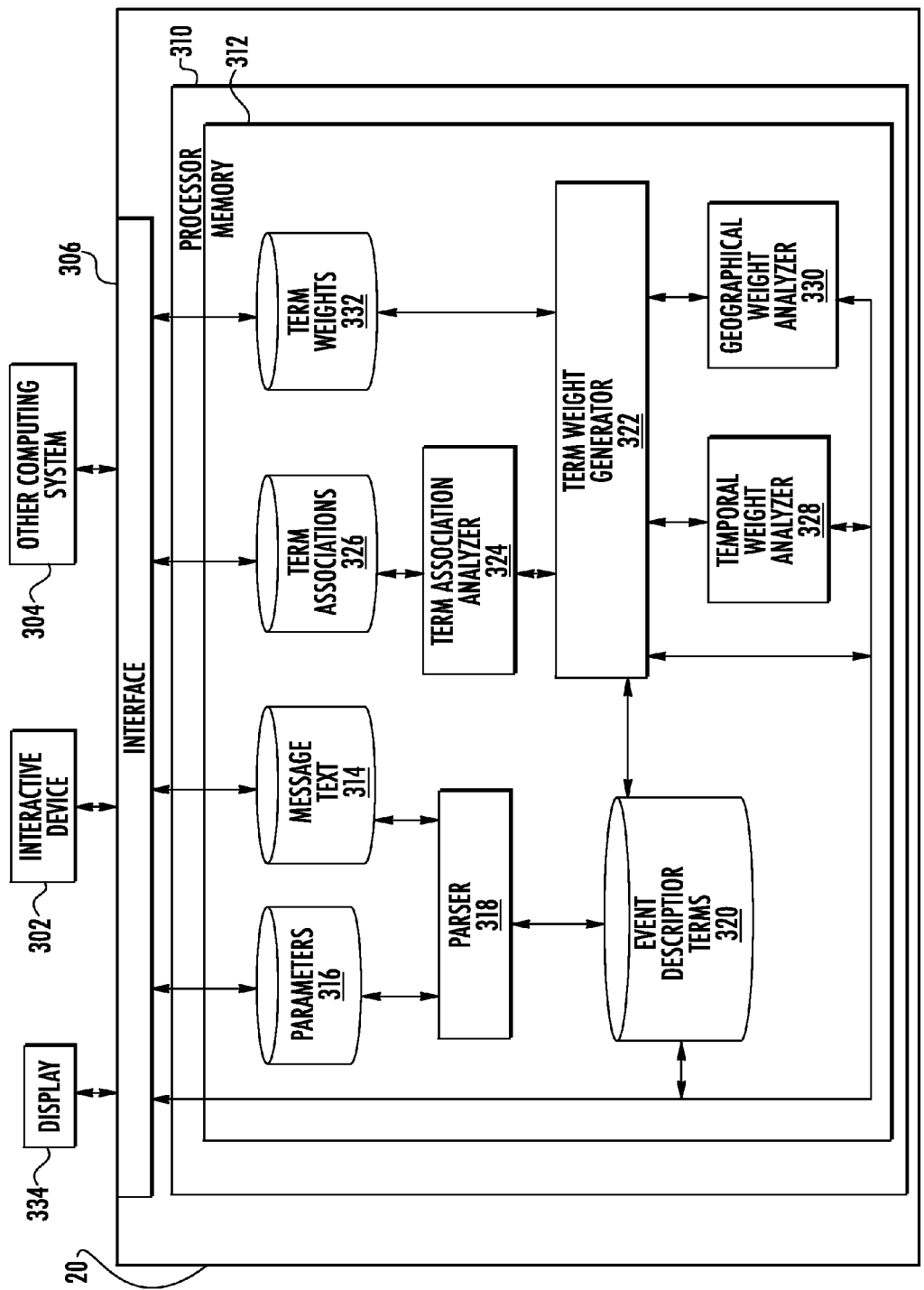
FIG. 3 is schematic diagram of the server shown in FIG. 1.

Referring now to FIG. 3, a schematic diagram of server 20 is shown, according to an exemplary embodiment. Server 20 is configured to receive text messages from interactive device 302 (e.g., message gateway 12, cellular phone 28, a local keyboard, a touch screen display, etc.) and from other computer system 304 (e.g., home computer 24, etc.) via interface 306. Interface 306 may be any number of hardware or software interfaces to support wireless or hardwired connections. For example, interface 306 may include a wireless receiver if interactive device 302 communicates wirelessly with server 20 and an ethernet port if computing system 304 communicates with server 20 over a hardwired local area network.

Server 20 includes processor 310 and memory 312. Although a single memory and processor are shown in FIG. 3, any number of processors or memory devices may be utilized within server 20. For example, memory 312 may include a ROM, EEPROM, hard drive, flash memory, CD-ROM, DVD-ROM, etc., or any number of different non-transitory memory devices (e.g., any computer readable medium, with the sole exception being a transitory, propagating signal) that are communicatively coupled to processor 312. Memory 312 may also include one or more machine instructions that, when executed by processor 310, cause processor 310 to perform one or more text message analysis functions. Similarly, processor 310 may be a single processor, a processor having multiple cores, or even multiple processors working in parallel. In other embodiments, some or all of the features of processor 310 and memory 312 may be distributed over a network and across different computer systems.

Memory 312 is shown to include message text 314, which may be received from interactive device 302 or computing system 304 via interface 306. Message text 314 may include one or more text messages related to one or more events. For example, message text 314 may include SMS text messages, "tweets," or other text related to an event. In some embodiments, message text 314 may also include additional information such as metadata or other text relating to the time and origin of the one or more messages.

Memory 312 is also shown to include parameters 316. Parameters 316 may include one or more configuration parameters received from interactive device 302 or computing system 304 via interface 306. For example, parameters 316 may contain one or more spatial and/or temporal constraints for the analysis of message text 314. Parameters 316 may also contain the term search results and provide them to display 334, interactive device 302, or to computing system 304 via interface 306.

Parser 318 uses the configuration data in parameters 316 to define a set of electronic messages in message text 314. For example, parameters 316 may include configuration data that requests information about messages within a specified time frame and/or originating from a specified location. Parser 318 may then limit the set of messages in message text 314 to be analyzed. In an alternative embodiment, parser 318 processes the full set of messages in message text 314 and the resulting terms from the analysis are limited by spatial or temporal constrains afterwards. Parser 318 is also configured to parse the messages received from message text 314 into a set of n-grams that are stored as event descriptor terms 320. Where spatial and or temporal constraints are received from parameters 316, the set of event descriptors 320 may also be limited by event, originating time and/or location. In some embodiments, parser 318 may also disregard stop words, URL segments, hyperlinks, or other elements of message text 314 that are unnecessary to determine event descriptor terms 320.

Memory 312 also includes term weight generator 322. Term weight generator 322 is configured to generate term weights for event descriptor terms 320. In some embodiments, term weight generator 322 may calculate a TFIDF score for event descriptor terms 320. These scores may be raw TFIDF scores or weighted TDIF scores that are modified based on the number nouns that appear in each n-gram.

Term weight generator may also receive term association data from term association analyzer 324. Term association analyzer is configured to analyze term associations 326 and to generate association strength values. For example, when term weight generator 322 analyzes a term in event descriptor terms 320, term weight generator may determine a set of associated words for the terms (e.g., term associations 326). Term association analyzer 324 may also receive the TFIDF scores for the associated terms in term associations 326 from term weight generator 322 and use them to generate association strength values. Term weight generator 322 may then use the term association strength values from term association analyzer 324 and the determined TFIDF scores to generate one or more term weights 332 for event descriptor terms 320.

In some embodiments, term weight generator 322 may also receive a temporal weight from temporal weight analyzer 328. In order to allow for less popular, possibly interesting event descriptors terms 320 to surface, term weight generator 322 may provide a temporal weighting factor to term weight generator 322 to discount the score of a descriptor depending on how popular it has been in the recent past. For example, the spatial discount score for an n-gram may be defined as a fraction of spatial sets or partitions (e.g. countries) that had activity surrounding this descriptor and determined using a dampening factor from parameters 316.

In another embodiment, term weight generator 330 may also receive geographical weights from geographical weight analyzer 330. For example, event descriptors that occur all over the world on a given day may not be as interesting compared to those that occur only in the spatio-temporal set of interest (e.g., in event descriptor terms 320). The spatial discount score for an n-gram may be defined as a fraction of spatial sets or partitions (e.g. countries) that had activity surrounding this descriptor and is based on one or more spatial bias values from parameters 316.

Term weight generator 322 utilizes the TFIDF scores, term association strength values, temporal weights, and/or geographical weights to determine term weights 332. Term weights 332 provide a weighting for event descriptor terms 320 that may then be used to select one or more event descriptor terms. For example, term weights 332 may be used to select the top five terms from event descriptor terms 320 for a given geographical location and time period. The selected terms may then be provided to display 334 (e.g., a monitor, a touch-screen display, a video projector, etc.), to interactive device 302, or to computing system 304 via interface 306 for display to a user. In some embodiments, the selected terms provided to the display also have associated visual indicia characteristics that are based on the term weight values. For example, the term weight values may be used to determine the size, shape, shading, or position of the selected event descriptor terms on the display.

Figure 4:
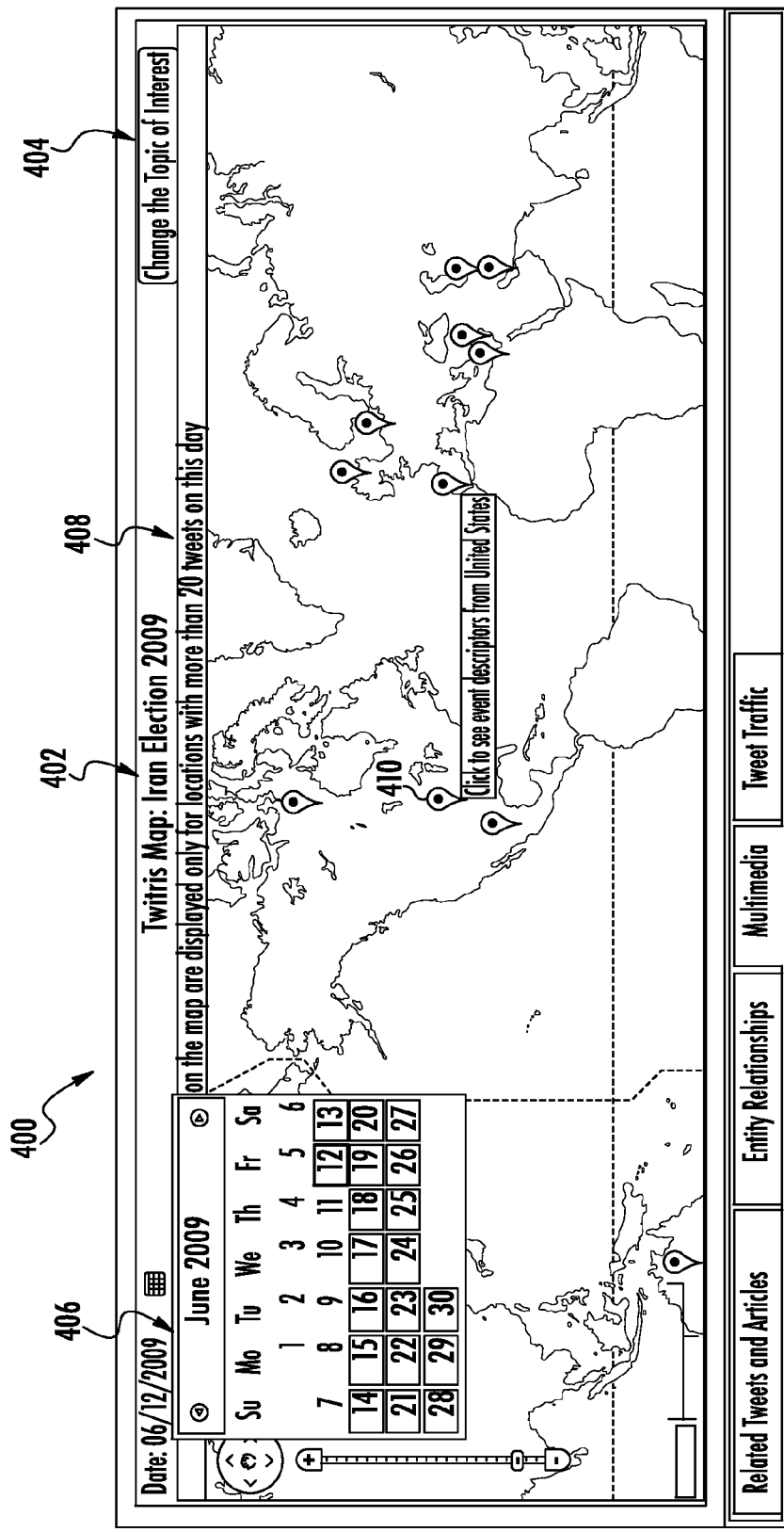
FIG. 4 shows an interface for a message analysis system.

Referring now to FIG. 4, interface 400 for a text message analysis system is shown, according to an exemplary embodiment. Interface 400 provides indicia of a selected event of interest 402, for example, "Iran Election 2009." Interface 400 also includes icon 404, which is configured to allow a user to select a different event of interest via an input device (e.g., a mouse, a touch screen display, etc.). Interface 400 also includes temporal input 406, which is configured to receive as input either a specific time or a range of time. Interface 400 also includes geographic input 410, which is configured to receive a selection of a geographical location by an input device as a geographical constraint. For example, a user may select Jun. 12, 2009 as a temporal constraint via input 406 and the United States as a geographic constraint via input 410. In some embodiments, interface 400 may display only those geographic locations having a certain number of text messages for the selected event and time frame and provide a notice 408 of this. For example, geographic inputs may only be provided by interface 400 for those locations that have more than 20 messages on Jun. 12, 2009. Selection of a geographic input (e.g., 410, etc.) by an input device may cause interface 400 to provide the event of interest data and the spatio-temporal constraints to a text message analysis system, in order to retrieve the corresponding event descriptors.

Figure 5:
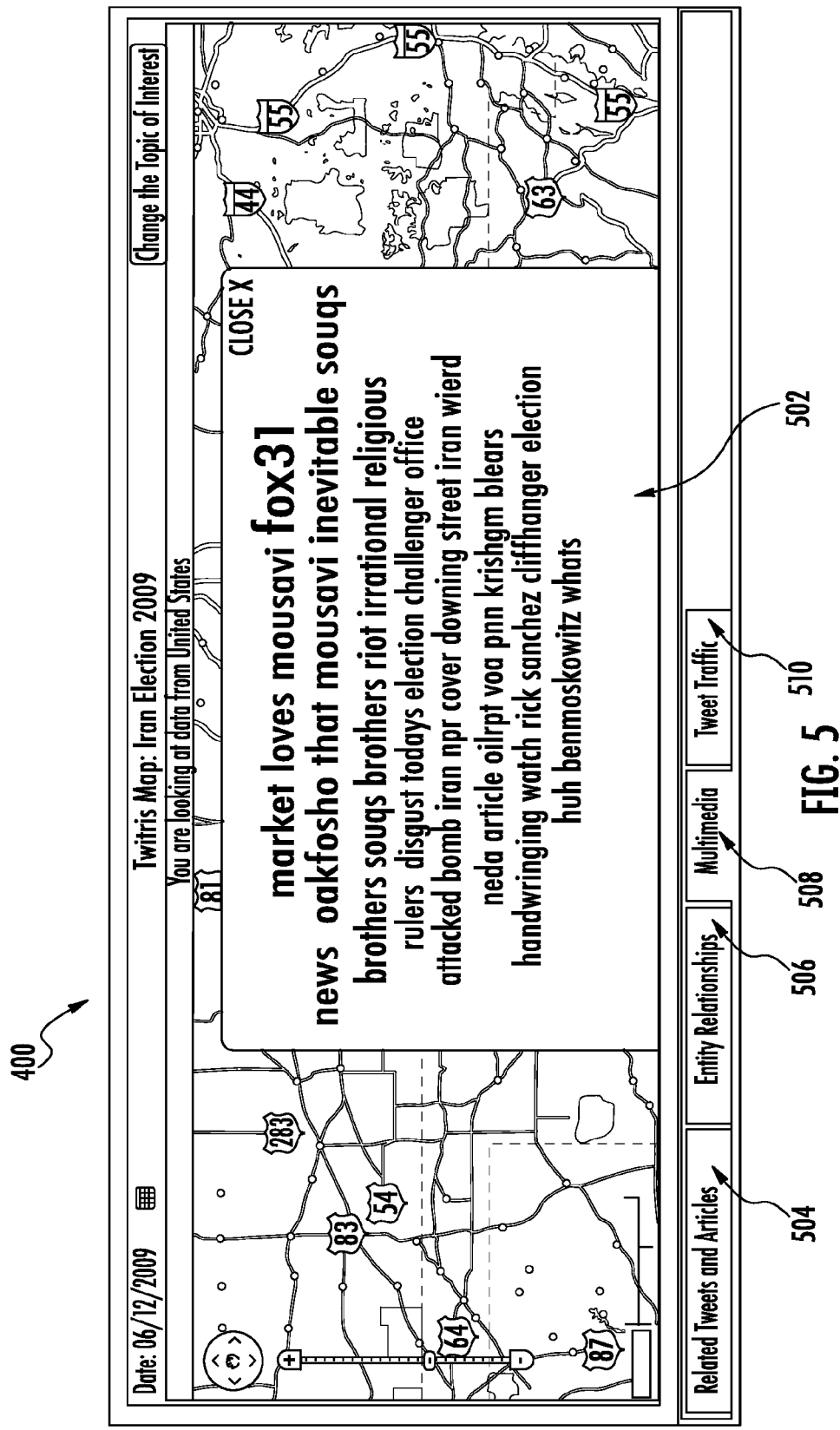
FIG. 5 shows the interface of FIG. 4 with displayed event descriptor terms.

Referring now to FIG. 5, interface 400 is shown, according to an exemplary embodiment. Selection of event of interest data (e.g., a thematic constraint such as the "2009 Iranian election") and spatio-temporal constraints by an input device causes interface 400 to display the event descriptors that match the event and constraints. For example, selection of input 410 shown in FIG. 4 would cause interface 400 to display event descriptors 502 for the 2009 Iranian Election found within text messages originating from the United States on Jun. 12, 2009. Event descriptors 502 may be displayed by interface 400 in any number of formats (e.g., an unsorted list, a sorted list, a matrix, a word cloud, etc.). In addition, event descriptors 502 may have associated visual indicia characteristics that are determined using their associated term weight values. In some embodiments, the term weight values may be used to determine the size, shape, shading, or position of the selected event descriptor terms on the display. For example, the term "fox31 news," as shown, may be presented as being larger than the term "npr coverage," to denote that "fox31 news" has a higher term weight value.

While it is useful to know what entities people are talking about, there might be different storylines surrounding these entities that could offer an insight into the social perceptions of an event. For example, discussions may be thematically grouped surrounding event descriptors, while also allowing a user of interface 400 to observe how these discussions change over time and space. One may take a simple clustering approach to this problem, forming k clusters, each representing a viewpoint or storyline within a spatio-temporal setting. While this is similar in spirit to clustering of documents to reveal storylines, a mutual information based approach may be used.

The n-gram of interest may be called as the focus word fw. The steps involved in identifying storylines surrounding fw are the following: 1) As in method 200, all associations for a focus word, Cfw={$aw_1$, $aw_2$, ... } may be found (i.e. thematically strong descriptors that collocate with the fw in the given spatio-temporal corpus). 2) In order to pick cues for complementary viewpoints, n associations may be picked from Cfw such that n<|Cfw| and all n associations are weakly associated with each other (lending support for separate threads of discussions). Weak associations are indicated by negative pmi scores (see computed association strengths herein). As before, association strengths are computed only from the underlying text messages in a spatio-temporal set in order to preserve observed signals. 3) For each of the n associations, a cluster may be generated and populated with a pair of words—the focus word and the association. The association is further removed from Cfw. The idea is to expand each cluster progressively by adding strongly associated descriptors from Cfw. Descriptors are added to a cluster if they result in a positive change in the Information Content of the cluster, i.e. increase the amount of information that was present in the cluster.

Creating word clusters using association strengths have been used in the past for assigning words to syntactic and semantic categories, learning language models and so on. The next step is to expand each of the n clusters. Refer to the cluster $n_i$ with the focus word fw and one association word as C1 and the associations for fw, Cfw as C2. The idea may be to gradually expand C1 by adding keywords from C2 that are strongly associated with C1. At every iteration, the algorithm may measure the change in Information Content (IC) of C1, $IC(C1, k_i)_\delta$, before and after adding every descriptor $k_i$ from C2 to C1 as:

$$IC(C1,k_i)_\delta = IC(C1,k_i) - IC(C1),$$

where $IC(C1, k_i)$ is the information content of C1 after adding keyword $k_i$ from C2. $IC(C1, k_i)_\delta$ is positive when $k_i$ is strongly associated with words in C1 and negative when $k_i$ is unrelated to words in C1. $IC(C1)$ is the strength of the semantic associations between words in the cluster and is defined as the average pairwise Mutual Information (MI) of the words.

$$IC(C1) = MI(C1) \binom{|C1|}{2},$$

where |C1| denotes the cardinality of the cluster C1 and $$\binom{|C1|}{2}$$

is the number of word pairs in the cluster C1, normalizing for clusters of different sizes. MI(C1) is the Mutual Information of cluster C1, defined as the sum of pairwise mutual information of words within the cluster.

$$MI(C1) = \Sigma hd\ w_{j, w_j \in C1, i \neq j} pmi(w_i, w_j)$$

where $pmi(w_i, w_j)$ is found at Eq. 2. The descriptor $k_i$ from C2 that results in a positive and minimum $IC(C1, k_i)_\delta$ score is added to C1 and removed from C2. Additionally, keywords resulting in negative $IC(C1, k_i)_\delta$ scores may be discarded as weak associations. The algorithm may terminate when all keywords in C2 have been evaluated or when no more keywords in C2 have positive $IC(C1, k_i)_\delta$ scores (no strong associations with C1). All co-occurrence statistics may be obtained only from the underlying corpus of text messages in a spatio-temporal set in order to preserve observed signals.

Referring still to FIG. 5, event descriptor terms 502 may also be used for further processing to provide a user with additional information about a topic, according to exemplary embodiments. As shown, interface 400 may include option 504 to view related tweets and articles. When option 504 is selected, a selection of a term in event descriptor term 502 can be used to retrieve additional messages and information about the term. For example, the term "fox31 news" can be selected with option 504 to initiate additional queries using "fox31 news" as a keyword. The additional queries may be local to the computing device that provides interface 400 to the display or may be to another computing device, such as a remote web server. Queries may be requests for additional electronic messages (e.g., tweets about "fox31 news" from Twitter™, emails from an email server, SMS text messages from, etc.) or for articles about the term (e.g., Wikipedia™ articles about "fox31 news," other news articles, etc.). Interface 400 then provides the retrieved information either directly to the display or as a link (e.g., a hyperlink, an icon, etc.) that redirects a user to the source of the information.

Option 506 allows a user to view entity relationships between the terms in event descriptor terms 502. In some embodiments, the entity relationships are ontological relationships, thereby also providing information about the type of relationship. For example, the descriptor "Iranian people" may be related to the descriptors "Persians" and "Azeris" by the relationship "includes." Interface 400 may utilize a selection of option 506 and one or more terms in event descriptors 502 to initiate a query to an application that determines entity relationships. For example, the application, Relfinder, may be used to determine entity relationships.

Option 508 allows a user to view multimedia files associated with a selected term in event descriptor terms 502. Selection of the term with option 508 initiates a query to the local computing device providing interface 400 or to another computing device, such as a remote web server, to retrieve multimedia files (e.g., video and/or audio files) that are associated with the selected term. For example, selection of the term "market loves mousavi" may initiate a query for multimedia files having this theme in their titles or descriptions. Interface 400 may then present the multimedia files to the display either as embedded files directly in interface 400 or as links (e.g., hyperlinks, web addresses, etc.) to the files. In this way, a user may learn more about a particular topic of interest.

Interface 400 further includes option 510 which, when selected by an input device, allows statistical information to be retrieved and displayed about event descriptors 510. In one embodiment, selection of option 510 may cause interface 400 to display indicia (e.g., a graph, a chart, a list, etc.) that conveys the number of electronic messages about the selected topic of interest as a function of time. For example, a graph may be displayed by interface 400 that shows the number of "tweets" from Twitter™ about the 2009 Iranian election as a function of time. In this way, a user is able to view interface 400 to determine which topics are still being discussed and which are not.

Figure 6:
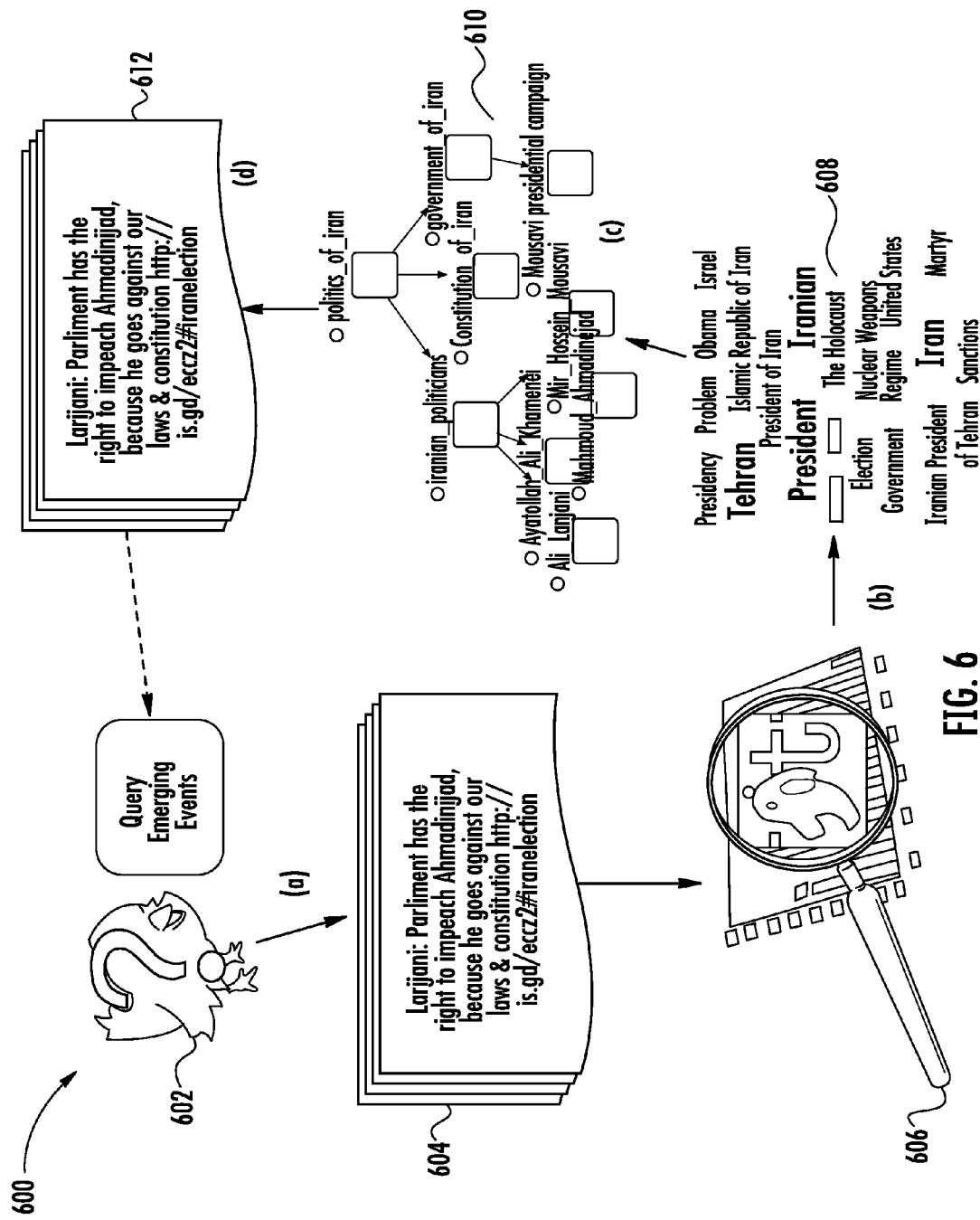
FIG. 6 shows a method for using event descriptor terms with dynamic domain models.

Referring now to FIG. 6, a method 600 for using event descriptor terms with dynamic domain models is shown, according to an exemplary embodiment. Method 600 illustrates a continuous process where data can be analyzed and re-analyzed using dynamic domain models. A query request may be provided to a computer, such as server 20 shown in FIG. 1, for information about electronic messages surrounding a particular event (602). For example, the query may request additional information about the 2009 Iranian elections from a collection of Twitter™ "tweets." The messages that are retrieved using the query are then parsed to determine event descriptor terms (604). The descriptor terms are also analyzed by the computer to generate term weight values for the event descriptor terms (606). The computer then uses the term weight values to select event descriptor terms (608). The functions in blocks 602, 604, 606, and 608 may be performed using any of the systems and methods described previously in the present disclosure.

The selected event descriptor terms may also be compared to a dynamic domain model (610). In general, dynamic domain models are hierarchal relationships that may be constructed using background information about a subject. For example, the topic, "politics of Iran," may include several sub-topics such as "Iranian politicians," "Constitution of Iran," and "government of Iran." Background information may be gathered from one or many sources of information, such as news services (e.g., FOX News™, NPR™, etc.), reference sites (e.g., Wikipedia™, etc.), or from other sources that may have additional information that provides background information for an event. Any number of techniques may be used to generate the dynamic domain models. For example, the model creation techniques disclosed in the article "Automatic Domain Model Creation Using Pattern-Based Fact Extraction" by C. Thomas, P. Mehra, W. Wang, A. Sheth, G. Weikum, and V. Chan may be used to generate the domain model, the entirety of which is hereby incorporated by reference.

Retrieving background information for the selected event descriptor terms and building a dynamic domain model allows additional concepts to be identified (612). For example, the additional terms "Larijani," "Ahmadinejad," and "constitution," may be identified using the domain model. These additional terms may be used to semantically annotate and support semantic analysis of the original electronic messages. In addition, the additionally identified terms may also be used to analyze subsequent messages by restricting annotation of the streaming messages to the domain spanned by the model. As the concepts and event descriptor terms present in the electronic messages change over time, the background information used to create the domain model may also change. For example, in the case of Wikipedia™, users of this service may update the background information as events unfold. In this case, method 600 acts as a feedback loop, thereby continually updating the domain model (610) to identify new concepts found within the background information. These additional concepts identified in the updated domain model can then be used to identify new concepts and relevant electronic messages. In this way, method 600 allows emerging events to be analyzed as they unfold (e.g., by analyzing electronic messages in real-time or near real-time).

Many modifications and variations of embodiments of the present invention are possible in light of the above description. The above-described embodiments of the various systems and methods may be used alone or in any combination thereof without departing from the scope of the invention. Although the description and figures may show a specific ordering of steps, it is to be understood that different orderings of the steps are also contemplated in the present disclosure. Likewise, one or more steps may be performed concurrently or partially concurrently.

The various operations of the methods and systems in the present disclosure may be accomplished using one or more processing circuits. For example a processing circuit may be an application-specific integrated circuit (ASIC), a specific-use processor, or any existing computer processor. One or more steps or functions in the present disclosure may also be accomplished using machine-readable instructions and data structures stored on non-transitory machine-readable media. For example, such media may comprise a floppy disc, CD-ROM, DVD-ROM, EEPROM, flash memory, or any other non-transitory medium capable of storing the machine-executable instructions and data structures and capable of being accessed by a computer or other electronic device having a processing circuit which, when executed thereby, cause the computer or device to perform the one or more steps or functions described by the machine executable instructions and/or data structures.

What is claimed is:

1. A system for analyzing electronic messages related to an event in context of a given geographical location and time period, comprising a processing circuit that stores one or more electronic messages related to the event in a memory, wherein the one or more electronic messages comprise information text and metadata providing temporal and geographical information; the processing circuit further determines sets of electronic messages using the temporal and geographical information provided by the one or more electronic messages to create a plurality of spatio-temporal sets of electronic messages, wherein the plurality of spatio-temporal sets of electronic messages comprise a spatio-temporal set of electronic messages for the event in a given geographical location and time period, and wherein the spatio-temporal set of electronic messages is related to the event; the processing circuit also parses the spatio-temporal set of electronic messages for the event to determine event descriptor terms from the information text provided by the electronic messages in the spatio-temporal set for the event in the given geographical location and time period; the processing circuit further generates term frequency values for the event descriptor terms determined from the information text provided by the electronic messages in the spatio-temporal set for the event in the given geographical location and time period and association strength values for the event descriptor terms determined from the information text provided by the electronic messages in the spatio-temporal set for the event in the given geographical location and time period; wherein the processing circuit also uses the term frequency values and the association strength values to generate term weight values that indicate relative thematic importance of the event descriptor terms determined from the information text provided by the electronic messages in the spatio-temporal set for the event in the given geographical location and time period; and wherein the processing circuit discounts the term weight values that indicate the relative thematic importance of the event descriptor terms based upon a fraction of the spatio-temporal sets of electronic messages in which the event descriptor terms occur; the processing circuit further uses the term weight values to select one or more event descriptor terms for the event in the given geographical location and time period, wherein the selected one or more event descriptor terms collectively reflect a general viewpoint or opinion of the event in the given geographical location and time period based on the electronic messages from the spatio-temporal set; and wherein the processing circuit also provides the selected event descriptor terms which collectively reflect the general viewpoint or opinion of the event in the given geographical location and time period based on the electronic messages from the spatio-temporal set to an electronic display.

2. The system of claim 1, wherein the processing circuit further generates the term frequency values using term frequency-inverse document frequency scores for the event descriptor terms.

3. The system of claim 2, wherein the processing circuit further generates the association strength values using the word co-occurrence frequencies between the event descriptor terms.

4. The system of claim 3, wherein the word co-occurrence frequencies are calculated by the processing circuit in part by determining a context for each event descriptor term; wherein the context for each event descriptor term comprises a set of associated words that co-occur with the event descriptor term in an electronic message; and wherein the set of associated words is limited to the most frequently co-occurring words in the message.

5. The system of claim 4, wherein the word co-occurrence frequencies are further calculated in part by determining the point-wise mutual information between each event descriptor term and the context of each word in the set of associated words.

6. The system of claim 1, wherein the given geographical location and time period spans a duration of time; and
the processing circuit discounts the term weight values that indicate the relative thematic importance of the event descriptor terms based upon a relative time of occurrence of the event descriptor terms within the duration of time.

7. The system of claim 1, wherein the processing circuit also determines visual indicia characteristics for the selected event descriptor terms using the term weight values and provides the visual indicia characteristics to the display.

8. A method for analyzing electronic messages related to an event in context of a given geographical location and time period, comprising:
storing one or more electronic messages related to the event in a memory, wherein the one or more electronic messages comprise information text and metadata providing temporal and geographical information;
determining, via a processor coupled to the memory, a set of electronic messages using the temporal and geographical information provided by the one or more electronic messages that is related to the event to create a spatio-temporal set of electronic messages for the event in a given geographical location and time period;
parsing, via the processor, the spatio-temporal set of electronic messages for the event in the given geographical location and time period to determine event descriptor terms from the information text provided by the electronic messages in the spatio-temporal set for the event in the given geographical location and time period;
generating, via the processor, term frequency values for the event descriptor terms determined from the information text provided by the electronic messages in the spatio-temporal set for the event in the given geographical location and time period;
generating, via the processor, association strength values for the event descriptor terms determined from the information text provided by the electronic messages in the spatio-temporal set for the event in the given geographical location and time period;
using, via the processor, the term frequency values and the association strength values to generate term weight values that indicate relative thematic importance of the event descriptor terms determined from the information text provided by the electronic messages in the spatio-temporal set for the event in the given geographical location and time period, wherein the given geographical location and time period spans a duration of time;

discounting, via the processor, the term weight values that indicate the relative thematic importance of the event descriptor terms based upon a relative time of occurrence of the event descriptor terms within the duration of time;

using, via the processor, the term weight values to select one or more event descriptor terms for the event in the given geographical location and time period, wherein the selected one or more event descriptor terms collectively reflect a general viewpoint or opinion of the event in the given geographical location and time period based on the electronic messages from the spatio-temporal set; and providing, via the processor, the selected event descriptor terms which collectively reflect the general viewpoint or opinion of the event in the given geographical location and time period based on the electronic messages from the spatio-temporal set to an electronic display coupled to the processor.

9. The method of claim 8, wherein the term frequency values are generated using term frequency-inverse document frequency scores of the event descriptor terms.

10. The method of claim 9, wherein the association strength values are generated using the word co-occurrence frequencies between the event descriptor terms.

11. The method of claim 10, wherein the word co-occurrence frequencies are calculated in part by determining a context for each event descriptor term; wherein the context for each event descriptor term comprises a set of associated words that co-occur with the event descriptor term in an electronic message; and wherein the set of associated words is limited to the most frequently co-occurring words in the message.

12. The method of claim 11, wherein the word co-occurrence frequencies are further calculated in part by determining the point-wise mutual information between each event descriptor term and the context of each word in the set of associated words.

13. The method of claim 8, further comprising:
determining, via the processor, an additional set of electronic messages using the temporal and geographical information provided by the one or more electronic messages; and discounting, via the processor, the term weight values that indicate the relative thematic importance of the event descriptor terms based upon a fraction of a group of sets of electronic messages in which the event descriptor terms occur, wherein the group of sets of electronic messages comprise the spatio-temporal set of electronic messages and the additional set of electronic messages.

14. A system for analyzing electronic messages related to an event in context of a given geographical location and time period, comprising:
a memory containing program instructions and one or more electronic messages related to the event, wherein the one or more electronic messages comprise information text and metadata providing temporal and geographical information;
a display; and
a processor coupled to the memory and the display, said program instructions when read from the memory and executed by the processor cause the processor to:
determine sets of electronic messages using the temporal and geographical information provided by the one or more electronic messages to create a plurality of spatio-temporal sets of electronic messages, wherein the plurality of spatio-temporal sets of electronic messages comprise a spatio-temporal set of electronic messages for the event in a given geographical location and time period, and wherein the spatio-temporal set of electronic messages is related to the event;

parse spatio-temporal set of electronic messages for the event to determine event descriptor terms from the information text provided by the electronic messages in the spatio-temporal set for the event in the given geographical location and time period;

generate term frequency values for the event descriptor terms determined from the information text provided by the electronic messages in the spatio-temporal set for the event in the given geographical location and time period;

generate association strength values for the event descriptor terms determined from the information text provided by the electronic messages in the spatio-temporal set for the event in the given geographical location and time period;

use the term frequency values and the association strength values to generate term weight values that indicate relative thematic importance of the event descriptor terms determined from the information text provided by the electronic messages in the spatio-temporal set for the event in the given geographical location and time period, wherein the given geographical location and time period spans a duration of time;

discount the term weight values that indicate the relative thematic importance of the event descriptor terms based upon a fraction of the spatio-temporal sets of electronic messages in which the event descriptor terms occur and a relative time of occurrence of the event descriptor terms within the duration of time;

use the term weight values to select one or more event descriptor terms determined from the information text provided by the electronic messages in the spatio-temporal set for the event in the given geographical location and time period, wherein the selected one or more event descriptor terms collectively reflect a general viewpoint or opinion of the event in the given geographical location and time period based on the electronic messages from the spatio-temporal set; and provide the selected event descriptor terms which collectively reflect the general viewpoint or opinion of the event in the given geographical location and time period based on the electronic messages from the spatio-temporal set to the electronic display.

15. The system of claim 14, wherein the term frequency values are generated using term frequency-inverse document frequency scores of the event descriptor terms.

16. The system of claim 15, wherein the association strength values are generated using the word co-occurrence frequencies between the event descriptor terms.

17. The system of claim 16, wherein the word co-occurrence frequencies are calculated in part by determining a context for each event descriptor term; wherein the context for each event descriptor term comprises a set of associated words that co-occur with the event descriptor term in an electronic message; and wherein the set of associated words is limited to the most frequently co-occurring words in the message.

18. The system of claim 17, wherein the word co-occurrence frequencies are further calculated in part by determining the point-wise mutual information between each event descriptor term and the context of each word in the set of associated words.

19. The system of claim 14, wherein the program instructions further cause the processor to use the term weight values to determine visual indicia characteristics for the selected event descriptor terms and to provide the visual indicia characteristics to the display.

* * * * *

UNITED STATES PATENT AND TRADEMARK OFFICE
CERTIFICATE OF CORRECTION

PATENT NO. : 8,688,791 B2  
APPLICATION NO. : 13/028397  
DATED : April 1, 2014  
INVENTOR(S) : Amit Sheth, Karthik Gomadam and Meenakshi Nagarajan Page 1 of 1

It is certified that error appears in the above-identified patent and that said Letters Patent is hereby corrected as shown below:

In the Specification

Col. 10, Line 27, "where ngram; (th)" should read --where ngram; $(th)^d$--; and Col. 14, Line 63, " $MI(C1) = \Sigma hdw_{i,wj \in C1, i \neq j} pmi(wi, wj)$ "

Should read -- $MI(C1) = \sum_{w_i, w_j \in C1, i \neq j} pmi(w_i, w_j)$ --.

Signed and Sealed this  
Sixth Day of January, 2015

Michelle K. Lee  
*Deputy Director of the United States Patent and Trademark Office*